Mar. 20, 1923.                    H. A. HARRIS                    1,449,041
                              VALUATION REGISTER
                              Filed Nov. 7, 1921              7 sheets-sheet 1

THE JOHN DOE COMPANY
WASHINGTON D.C.
CONSTRUCTION.

SCHEDULES BY YEARS OF ACQUISITIONS AND DEPRECIATIONS

ESTIMATED LIFE, 65 YEARS, AS DETERMINED BY A HARRIS MULTI-CHRONOMETRICAL VALUATION.
RATE FOR CURRENT YEAR OF ACQUISITION .007695
RATE FOR EACH FULL YEAR THEREAFTER UNTIL EXTINGUISHED .01539

| YEAR | ACQUISITION | DEPRECIATION ACCRUED TO DEC. 31-1908 RATE | AMOUNT | DEPRECIATION FOR CALENDAR YEARS ENDED DECEMBER 31 |||||||
|---|---|---|---|---|---|---|---|---|---|---|
| | | | | 1909 | 1910 | 1911 | 1912 | 1913 | 1914 | 1915 |
| 1895 | $6,300.00 | .20777 | $1,308.95 | $96.95 | $96.96 | $96.95 | $96.96 | $96.95 | $96.96 | $96.95 |
| 1896 | 891.58 | .19238 | 171.52 | 13.72 | 13.72 | 13.72 | 13.72 | 13.72 | 13.72 | 13.72 |
|  | $7,191.58 |  |  |  |  |  |  |  |  |  |
| 1899 | 504.15 | .14621 | 73.71 | 7.76 | 7.76 | 7.76 | 7.76 | 7.76 | 7.76 | 7.76 |
|  | $7,695.73 |  |  |  |  |  |  |  |  |  |
| 1900 | 1,500.00 | .13082 | 196.23 | 23.08 | 23.09 | 23.08 | 23.09 | 23.08 | 23.09 | 23.08 |
|  | $9,195.73 |  |  |  |  |  |  |  |  |  |
| 1903 | 7,750.47 | .08465 | 656.08 | 119.28 | 119.28 | 119.28 | 119.28 | 119.28 | 119.28 | 119.28 |
|  | $16,946.20 |  |  |  |  |  |  |  |  |  |
| 1904 | 8,390.00 | .06926 | 581.09 | 129.12 | 129.12 | 129.12 | 129.12 | 129.12 | 129.12 | 129.12 |
|  | $25,336.20 |  |  |  |  |  |  |  |  |  |
| 1907 | 2,700.00 | .02309 | 62.34 | 41.55 | 41.56 | 41.55 | 41.56 | 41.55 | 41.56 | 41.55 |
|  | $28,036.20 |  |  | $431.46 | $431.49 | $431.46 |  |  |  |  |
| 1912 | 1,713.12 |  |  |  |  |  | 13.18 | 26.36 | 26.37 | 26.36 |
|  | $29,749.32 |  |  |  |  |  | $444.67 |  |  |  |
| 1913 | 8,562.91 |  |  |  |  |  |  | 65.89 | 31.78 | 131.79 |
| TOTAL ACQUISITIONS | $38,312.23 |  | $3,049.92 | $3,481.38 | $3,912.87 | $4,344.33 | $4,789.00 | $5,312.71 | $5,902.35 | $6,491.96 |
|  |  |  | $3,049.92 |  |  |  |  | $523.71 | $589.64 | $589.61 |

DEPRECIATION ACCRUED TO END OF PERIOD

Fig. 1

Inventor:
Henry Archibald Harris

Mar. 20, 1923.

H. A. HARRIS
VALUATION REGISTER
Filed Nov. 7, 1921

THE JOHN DOE COMPANY
WASHINGTON D.C.

MACHINERY

SCHEDULES BY YEARS OF ACQUISITIONS AND DEPRECIATIONS

ESTIMATED LIFE 37 YEARS AS DETERMINED BY A HARRIS MULTI-CHRONOMETRICAL VALUATION
RATE FOR CURRENT YEAR OF ACQUISITION .013515 — 29
RATE FOR EACH FULL YEAR THEREAFTER UNTIL EXTINGUISHED .02703 — 28

| YEAR | ACQUISITION | DEPRECIATION ACCRUED TO DECEMBER 31-1908 | | DEPRECIATION FOR CALENDAR YEARS ENDED DECEMBER 31 | | | | | | | |
|---|---|---|---|---|---|---|---|---|---|---|---|
| | | RATE | AMOUNT | 1909 | 1910 | 1911 | 1912 | 1913 | 1914 | 1915 |
| 1904 | $7,694.32 | .12164 | $935.94 | $207.98 | $207.98 | $207.98 | $207.98 | $207.98 | $207.98 | $207.98 |
| 1905 | 12,421.96 $20,116.28 | .09461 | 1,175.24 | 335.76 | 335.77 | 335.76 | 335.77 | 335.76 | 335.77 | 335.76 |
| 1907 | 8,642.98 $28,759.26 | .04055 | 350.47 | 233.62 | 233.62 | 233.62 | 233.62 | 233.62 | 233.62 | 233.62 |
| 1908 | 12,004.26 $40,763.52 | | 162.24 $2,623.89 | 324.47 | 324.48 | 324.47 | 324.48 | 324.47 | 324.48 | 324.47 |
| 1909 | 17,123.88 $57,887.40 | | | 231.43 $1,333.26 | 462.86 | 462.86 | 462.86 | 462.86 | 462.86 | 462.86 |
| 1910 | 2,835.71 $60,723.11 | | | | 38.32 $1,603.03 | 76.65 | 76.65 | 76.65 | 76.65 | 76.65 |
| 1911 | 14,656.44 $75,379.55 | | | | | 198.08 $1,839.42 | 396.16 | 396.17 | 396.16 | 396.17 |
| 1912 | 9,865.69 $85,245.24 | | | | | | 133.33 $2,170.85 | 266.67 | 266.67 | 266.67 |
| 1913 | 19,672.85 $104,918.09 | | | | | | | 265.88 $2,570.06 | 531.76 | 531.76 |
| 1914 | 8,654.32 $113,572.41 | | | | | | | | 116.96 $2,952.91 | 233.92 |
| 1915 | 7,896.75 | | | | | | | | | | 106.72 $3,176.58 |
| TOTAL ACQUISITIONS | $121,469.16 | | | | | | | | | | |
| DEPRECIATION ACCRUED TO END OF PERIOD | | | $2,623.89 | $3,957.15 | $5,560.18 | $7,399.60 | $9,570.45 | $12,140.51 | $15,093.42 | $18,270.00 |

Fig. 2.

Inventor:
Henry Archibald Harris.
Harris & Harris
Attys.

Mar. 20, 1923. 1,449,041

H. A. HARRIS
VALUATION REGISTER
Filed Nov. 7, 1921      7 sheets-sheet 3

Fig. 3

THE JOHN DOE COMPANY
WASHINGTON D.C.
CONSTRUCTION BUILDINGS

SUMMARY OF ACQUISITIONS BY CLASSIFICATION OF PROPERTIES BY YEARS AND TOTAL OF ACQUISITIONS AS AT DECEMBER 31 YEARLY VALUES AND ESTIMATED LIFE AS DETERMINED THROUGH A PHYSICAL INVENTORY AT COST MADE BY A HARRIS MULTI-CHRONOMETRICAL VALUATION AS OF SEPTEMBER 25 1920

| 30 | 31 | 32 TOTAL TO DEC. 31 1908. | 33 1909 | | 34 1910 | |
|---|---|---|---|---|---|---|
| CLASSIFICATION | SCHEDULE | | ACQUISITIONS | TOTAL | ACQUISITIONS | TOTAL |
| 20 YEAR LIFE | I-A-1 | $ — | $ — | — | $ — | — |
| 40 YEAR LIFE | I-A-2 | 3,748.22 | — | 3,748.22 | — | 3,748.22 |
| 50 YEAR LIFE | I-A-3 | 9,937.00 | — | 9,937.00 | — | 9,937.00 |
| 60 YEAR LIFE | I-A-4 | 6,109.91 | — | 6,109.91 | — | 6,109.91 |
| 65 YEAR LIFE | I-A-5 | 28,036.20 | — | 28,036.20 | — | 28,036.20 |
| 75 YEAR LIFE | I-A-6 | 11,980.00 | — | 11,980.00 | 36,600.17 | 48,580.17 |
| 100 YEAR LIFE | I-A-7 | — | — | — | — | — |
| TOTALS | | $59,811.33 | $ — | $59,811.33 | $36,600.17 | $96,411.50 |

| 35 1911 | | 36 1912 | | 37 1913 | | 38 1914 | | 39 1915 | |
|---|---|---|---|---|---|---|---|---|---|
| ACQUISITION | TOTAL | ACQUISITION | TOTAL | ACQUISITION | TOTAL | ACQUISITION | TOTAL | ACQUISITION | TOTAL |
| $ — | — | $180.00 | $180.00 | $ — | $180.00 | $ — | $180.00 | $ — | $180.00 |
| 4,078.00 | 7,826.22 | — | 7,826.22 | — | 7,826.22 | — | 7,826.22 | — | 7,826.22 |
| 1,600.00 | 11,537.00 | — | 11,537.00 | — | 11,537.00 | — | 11,537.00 | — | 11,537.00 |
| — | 6,109.91 | — | 6,109.91 | — | 6,109.91 | — | 6,109.91 | — | 6,109.91 |
| — | 28,036.20 | 1,713.12 | 29,749.32 | 8,562.91 | 38,312.23 | — | 38,312.23 | — | 38,312.23 |
| — | 48,580.17 | — | 48,580.17 | — | 48,580.17 | 17,676.00 | 66,256.17 | — | 66,256.17 |
| — | — | — | — | — | — | — | — | — | — |
| $5,678.00 | $102,089.50 | $1,893.12 | $103,982.62 | $8,562.91 | $112,545.53 | $17,676.00 | $130,221.53 | $ — | $130,221.53 |

Inventor:
Henry Archibald Harris

Mar. 20, 1923.  1,449,041

H. A. HARRIS
VALUATION REGISTER
Filed Nov. 7, 1921

THE JOHN DOE COMPANY
WASHINGTON D.C.
CONSTRUCTION BUILDINGS

SUMMARY OF DEPRECIATION BY CLASSIFICATION OF PROPERTIES BY YEARS AND TOTAL OF DEPRECIATION AS AT DECEMBER 31 YEARLY VALUES AND ESTIMATED LIFE AS DETERMINED THROUGH A PHYSICAL INVENTORY AT COST MADE BY A HARRIS MULTI-CHRONOMETRICAL VALUATION AS OF SEPTEMBER 25-1920

*Fig. 4.*

| 40 CLASSIFICATION | 41 SCHEDULE | 42 TOTAL TO DECEMBER 31-1908 | 43 1909 DEPRECIATION TOTAL | | 44 1910 DEPRECIATION TOTAL | |
|---|---|---|---|---|---|---|
| 20 YEAR LIFE | I-A-1 | $ - | $ - | - | $ - | - |
| 40 YEAR LIFE | I-A-2 | 226.76 | 93.70 | 320.46 | 93.71 | 414.17 |
| 50 YEAR LIFE | I-A-3 | 726.07 | 198.74 | 924.81 | 198.74 | 1,123.55 |
| 60 YEAR LIFE | I-A-4 | 241.57 | 101.84 | 343.41 | 101.86 | 445.27 |
| 65 YEAR LIFE | I-A-5 | 3,049.92 | 431.46 | 3,481.38 | 431.49 | 3,912.87 |
| 75 YEAR LIFE | I-A-6 | 364.64 | 159.81 | 524.45 | 403.94 | 928.39 |
| 100 YEAR LIFE | I-A-7 | - | - | - | - | - |
| TOTALS | | $4,608.96 | $983.55 | $5,594.51 | $1,229.74 | $6,824.25 |

| 45 1911 DEPRECIATION TOTAL | | 46 1912 DEPRECIATION TOTAL | | 47 1913 DEPRECIATION TOTAL | |
|---|---|---|---|---|---|
| $ - | - | $ 4.50 | 4.50 | $ 9.00 | 13.50 |
| 144.68 | 558.85 | 195.66 | 754.51 | 195.65 | 950.16 |
| 214.74 | 1,338.29 | 230.74 | 1,569.03 | 230.74 | 1,799.77 |
| 101.84 | 547.11 | 101.86 | 648.97 | 101.84 | 750.81 |
| 431.46 | 4,344.33 | 444.67 | 4,789.00 | 523.71 | 5,312.71 |
| 648.05 | 1,576.44 | 648.07 | 2,224.51 | 648.05 | 2,872.56 |
| - | - | - | - | - | - |
| $1,540.77 | $8,365.02 | $1,625.50 | $9,990.52 | $1,708.99 | $11,699.51 |

| 48 1914 DEPRECIATION TOTAL | | 49 1915 DEPRECIATION TOTAL | |
|---|---|---|---|
| $ 9.00 | 22.50 | $ 9.00 | 31.50 |
| 195.66 | 1,145.82 | 195.65 | 1,341.47 |
| 230.74 | 2,030.51 | 230.74 | 2,261.25 |
| 101.86 | 852.67 | 101.84 | 954.51 |
| 589.64 | 5,902.35 | 589.61 | 6,491.96 |
| 765.97 | 3,638.53 | 883.85 | 4,522.38 |
| - | - | - | - |
| $1,892.87 | $13,592.38 | $2,010.69 | $15,603.07 |

*Inventor:*
*Henry Archibald Harris*

Mar. 20, 1923.

H. A. HARRIS
VALUATION REGISTER
Filed Nov. 7, 1921

THE JOHN DOE COMPANY
WASHINGTON D.C.

SUMMARY OF ACQUISITIONS BY CLASSIFICATION OF PROPERTIES BY YEARS AND TOTAL OF ACQUISITIONS AS AT DECEMBER 31 YEARLY VALUES AND ESTIMATED LIFE AS DETERMINED THROUGH A PHYSICAL INVENTORY AT COST MADE BY A HARRIS MULTI-CHRONOMETRICAL VALUATION AS OF SEPTEMBER 25-1920.

| CLASIFICATION | SCHEDULE | PAGE | TOTAL TO DEC. 31 1908. | 1909 ACQUISITIONS | TOTAL | 1910 ACQUISITIONS | TOTAL |
|---|---|---|---|---|---|---|---|
| BUILDINGS | I-A | 25 | $59,811.35 | $ - | $59,811.33 | $36,600.17 | $96,411.50 |
| BUILDING EQUIPMENT | I-B | 34 | 22,807.27 | - | 22,807.27 | 11,806.36 | 34,613.63 |
| POWER | I-C | 76 | 2,868.45 | 80.25 | 2,948.70 | 12,211.26 | 15,159.96 |
| MACHINERY | I-D | 98 | 53,087.30 | - | 53,087.30 | 1,516.20 | 54,603.50 |
| MILL EQUIPMENT | I-E | 119 | 838.05 | 17.50 | 855.55 | 918.48 | 1,774.03 |
| GROUND EQUIPMENT | I-F | 163 | 2,899.74 | 845.43 | 3,745.17 | 4,299.87 | 8,045.04 |
| AUTOMOBILES | I-G | 172 | - | - | - | - | - |
| OFFICE FIXTURES AND EQUIPMENT | I-H | 173 | - | - | - | 4.00 | 4.00 |
| TOTALS | | | $142,312.14 | $943.18 | $143,255.32 | $67,356.34 | $210,611.66 |

| 1911 ACQUISITIONS | TOTAL | 1912 ACQUISITIONS | TOTAL | 1913 ACQUISITIONS | TOTAL | 1914 ACQUISITIONS | TOTAL | 1915 ACQUISITIONS | TOTAL |
|---|---|---|---|---|---|---|---|---|---|
| $5,678.00 | $102,089.50 | $1,893.12 | $103,982.62 | $8,562.91 | $112,545.53 | $17,676.00 | $130,221.53 | $ - | $130,221.53 |
| 860.58 | 35,474.21 | 1,599.24 | 37,073.45 | 283.27 | 37,356.72 | 2,074.44 | 39,431.16 | 965.00 | 40,396.16 |
| 375.00 | 15,534.96 | 2,039.08 | 17,574.04 | - | 17,574.04 | 633.12 | 18,207.16 | 16,331.90 | 34,539.06 |
| 1,661.58 | 56,265.08 | 71,859.89 | 128,124.97 | 1,575.00 | 129,699.97 | 17,120.60 | 146,820.57 | 2,237.06 | 149,057.63 |
| 1,161.28 | 1,935.31 | 388.89 | 2,324.20 | 106.00 | 2,430.20 | 1,073.87 | 3,504.07 | 303.90 | 3,807.97 |
| - | 8,045.04 | 220.49 | 8,265.53 | - | 8,265.53 | - | 8,265.53 | - | 8,265.53 |
| - | - | - | - | - | - | - | - | - | - |
| 4.00 | 4.00 | - | 4.00 | - | 4.00 | 4.00 | 410.00 | 414.00 |
| $8,736.44 | $219,348.10 | $78,000.71 | $297,348.81 | $10,527.18 | $307,875.99 | $38,578.03 | $346,454.02 | $20,247.86 | $366,701.88 |

Inventor:
Henry Archibald Harris.
Attys.

Mar. 20, 1923.

H. A. HARRIS
VALUATION REGISTER
Filed Nov. 7, 1921

THE JOHN DOE COMPANY
WASHINGTON D.C.

SUMMARY OF DEPRECIATION BY CLASSIFICATION OF PROPERTIES BY YEARS, AND TOTAL OF DEPRECIATION AS AT DECEMBER 31 YEARLY VALUES AND ESTIMATED LIFE AS DETERMINED THROUGH A PHYSICAL INVENTORY AT COST MADE BY A HARRIS MULTI-CHRONOMETRICAL VALUATION AS OF SEPTEMBER 25,1920.

| CLASSIFICATION | SCHEDULE | PAGE | TOTAL TO DECEMBER 31,1908 | 1909 DEPRECIATION | TOTAL | 1910 DEPRECIATION | TOTAL |
|---|---|---|---|---|---|---|---|
| BUILDINGS | II A | 26 | $4,608.96 | $985.55 | $5,594.51 | $1,229.74 | $6,824.25 |
| BUILDING EQUIPMENT | II B | 37 | 1,970.25 | 672.36 | 2,642.61 | 835.77 | 3,478.38 |
| POWER | II C | 77 | 386.18 | 84.36 | 470.54 | 283.40 | 753.94 |
| MACHINERY | II D | 99 | 8,112.27 | 1,176.92 | 9,289.19 | 1,201.90 | 10,491.09 |
| MILL EQUIPMENT | II E | 120 | 139.99 | 35.88 | 175.87 | 57.09 | 232.96 |
| GROUND EQUIPMENT | II F | 164 | 211.21 | 65.62 | 276.83 | 97.79 | 374.62 |
| AUTOMOBILES | I G | 172 | – | – | – | – | – |
| OFFICE FIXTURES AND EQUIPMENT | II H | 174 | – | – | – | .13 | .13 |
| TOTALS | | | $15,428.86 | $3,020.69 | $18,449.55 | $3,705.82 | $22,155.37 |

| 1911 DEPRECIATION | TOTAL | 1912 DEPRECIATION | TOTAL | 1913 DEPRECIATION | TOTAL | 1914 DEPRECIATION | TOTAL | 1915 DEPRECIATION | TOTAL |
|---|---|---|---|---|---|---|---|---|---|
| $1,540.77 | $8,365.02 | $1,625.50 | $9,990.52 | $1,708.99 | $11,699.51 | $1,892.87 | $13,592.38 | $2,010.69 | $15,603.07 |
| 1,013.15 | 4,491.53 | 1,054.37 | 5,545.90 | 1,085.82 | 6,631.72 | 1,117.76 | 7,749.48 | 1,155.42 | 8,904.90 |
| 488.60 | 1,242.54 | 528.89 | 1,771.43 | 562.83 | 2,334.26 | 573.43 | 2,907.69 | 862.69 | 3,770.38 |
| 1,266.05 | 11,757.14 | 2,213.53 | 13,970.67 | 3,144.48 | 17,115.15 | 3,421.58 | 20,536.73 | 3,716.99 | 24,253.72 |
| 83.06 | 316.02 | 98.43 | 414.45 | 110.62 | 525.07 | 134.27 | 659.34 | 165.11 | 824.45 |
| 124.65 | 499.27 | 129.08 | 628.35 | 133.47 | 761.82 | 133.49 | 895.31 | 133.47 | 1,028.78 |
| – | – | – | – | – | – | – | – | – | – |
| .26 | .39 | .27 | .66 | .26 | .92 | .27 | 1.19 | 7.09 | 8.28 |
| $4,516.54 | $26,671.91 | $5,650.07 | $32,321.98 | $6,746.47 | $39,068.45 | $7,273.67 | $46,342.12 | $8,051.46 | $54,393.58 |

Fig. 6.

Inventor:
Henry Archibald Harris
Attys.

Mar. 20, 1923.                                                                1,449,041
                              H. A. HARRIS
                           VALUATION REGISTER
                           Filed Nov. 7, 1921                        7 sheets-sheet 7

THE JOHN DOE COMPANY
WASHINGTON D.C.
COMPOSITE RATES OF DEPRECIATION – DETAIL
BUILDINGS

MULTI-CHRONOMETRICAL-CLASSIFICATION

| CLASSIFICATION | ACQUISITION | ESTIMATED YEARS OF LIFE | ANNUAL RATE | ANNUAL DEPRECIATION |
|---|---|---|---|---|
| CONSTRUCTION | 180.00 | 20 | .05 | 9.00 |
| CONSTRUCTION | 7,826.22 | 40 | .025 | 195.65 |
| CONSTRUCTION | 11,537.00 | 50 | .02 | 230.74 |
| CONSTRUCTION | 6,109.91 | 60 | .01667 | 101.94 |
| CONSTRUCTION | 38,312.23 | 65 | .01539 | 589.61 |
| CONSTRUCTION | 66,256.17 | 75 | .01334 | 883.85 |
| CONSTRUCTION |  | 100 | .01 |  |
|  | 130,221.53 |  |  | 2,010.69 |

RATE FOR CURRENT YEAR OF ACQUISITION   .00772
RATE FOR FULL YEAR                     .01544

Fig. 7.

THE JOHN DOE COMPANY
WASHINGTON D.C.
MULTI-CHRONOMETRICAL
COMPOSITE RATES OF DEPRECIATION

| CLASSIFICATION | RATE FOR CURRENT YEAR OF ACQUISITION | RATE FOR FULL YEAR |
|---|---|---|
| BUILDINGS | .00772 | .01544 |
| BUILDING EQUIPMENT | .015535 | .03107 |
| POWER | .017375 | .03475 |
| MACHINERY | .012425 | .02485 |
| MILL EQUIPMENT | .030505 | .06101 |
| GROUND EQUIPMENT | .010315 | .02063 |
| AUTOMOBILES | .071435 | .14287 |
| OFFICE FIXTURES AND EQUIPMENT | .02293 | .04586 |

Fig. 8.

Inventor:
Henry Archibald Harris
Attys

Patented Mar. 20, 1923.

1,449,041

UNITED STATES PATENT OFFICE.

HENRY ARCHIBALD HARRIS, OF CHICAGO, ILLINOIS.

VALUATION REGISTER.

Application filed November 7, 1921. Serial No. 513,846.

*To all whom it may concern:*

Be it known that I, HENRY ARCHIBALD HARRIS, a citizen of the United States, residing at Chicago, in the county of Cook and State of Illinois, have invented certain new and useful Improvements in Valuation Registers, of which the following is a specification.

This invention has to do with certain improvements in valuation registers and the like. In order that the features of the invention and the relationship of the various elements hereinafter disclosed may be better understood and appreciated, I will first explain certain of the fundamental purposes and objects sought to be accomplished by the use of the present invention.

The valuation of any given property whether tangible or intangible may be based either on its present replacement value or on its present value as determined by the original cost, taking into account the estimated depreciation up to the date at which the value is sought to be ascertained. The value on the date of the valuation may be readily ascertained either on the present replacement basis or on the estimated depreciated basis, but the estimation of the value at some date between the date of acquisition and the date of valuation involves an estimation of the depreciated value up to such intervening date only.

It is frequently desirable to be able to ascertain the value of the properties not only at the present or valuation date, but at some intermediate or intervening date. This is true for example in the case of certain tax returns where proper application of the statute involves a knowledge of the invested capital at a prior date as for example December 31, 1908. The ascertainment of the invested capital at such date has in the past involved so many factors of uncertainty and difficulty that it has been practically impossible to make an accurate estimate of the invested capital at such prior date, but by the use of the features of invention to be herein disclosed it becomes possible to make an accurate valuation either as of December 31, 1908, or any other date during the life of the properties, considered either singly or as a group.

The complexity of the problem may be better appreciated when it is considered that most industrial and commercial establishments contain machinery and other properties of different classifications which are subject to different rates of depreciation, and when it is remembered that even different individual properties of a given classification may themselves have widely different estimated rates of depreciation. For example, the classification of buildings may include more or less temporary structures and wooden structures subject to relatively rapid depreciation, and may also include permanent structures of brick or concrete of much slower depreciation.

The problem is still further complicated by the fact that manufacturing establishments which have been in operation for any considerable length of time almost always include properties acquired at different times, so that the depreciated value on any specific date will also involve the correct estimated depreciation of each individual property taking care of its age up to that date.

One of the objects of the present invention is to provide a register by means of which the properties of each classification may be brought together in the most convenient manner for the proper application of their rates of depreciation year by year, also taking into account the acquisitions year by year, so that the depreciated value of each group of properties may be estimated from year to year, and so that the depreciated value of said properties taking into account yearly acquisitions may also be estimated year by year. Also in this connection, to make provision for ascertaining the acquisitions year by year according to various classifications, and also for ascertaining the depreciation year by year for various classifications, so that the amount of money actually invested from time to time may be estimated as well as the depreciations taking place thereon.

Another object of the invention is to make provision for ascertaining what may be called a composite rate of depreciation of each classification of properties, taking into account the actual relative amounts invested in properties of different estimated useful lengths of life within such classifications, so that the future yearly depreciation may be estimated for such group of properties as a whole in the simplest possible manner.

Another object of the invention is to provide within a register capable of giving the foregoing results, provision for a permanent record of the acquisitions and depreciations year by year, so that if at any time in the future it should be desired to estimate the invested capital for any group or portion of properties or for the entire plant as of any given date such estimate immediately may be effected without the necessity of going through a tremendous amount of additional work, a great deal of which would be a repetition of work already performed.

Other objects and uses of the invention will appear from a detailed description of the same, which consists in the features of invention and combinations of parts and arrangements and combinations of schedules hereinafter described and claimed.

In the drawings:

Figure 1 shows a typical schedule showing the acquisitions during individual years, the acquisitions up to the end of each year, the depreciation during each year on new acquisitions as well as on acquisitions of previous years, and also the depreciation during each year and the accrued depreciation up to the end of each year, for a particular classification of properties. In the particular schedule shown in Fig. 1 the application of the above features is shown as applied to the classification "construction." This schedule also shows the depreciation accrued to a specific date namely, December 31, 1908, on this particular classification;

Fig. 2 shows a schedule similar to that of Fig. 1 with the exception that it refers to another specific classification of property namely, "machinery".

It is noted that in the schedule of Fig. 1 "construction" there are only shown "construction" items of an estimated life of sixty-five years, and that in Fig. 2 there are only shown "machinery" items of an estimated life of thirty-seven years.

Fig. 3 shows a schedule of the acquisitions year by year and the total acquisitions up to the end of each year for a particular classification namely, "construction, buildings", including items in this category having different estimated years of useful life. This schedule also shows the total acquisitions year by year and the total accrued acquisitions at the end of each year for all of the items of such category including those of different estimated years of useful life;

Fig. 4 shows a typical schedule for a specific category namely "construction, buildings" showing the depreciation during each year and the accrued depreciation at the end of each year for items within such category having different estimated years of useful life. This schedule also shows the total depreciation during each year and the total accrued depreciation up to the end of each year for all of the items of such category having different estimated years of useful life.

It is also noted that Figs. 3 and 4 respectively show the total acquisitions and the total depreciations for items of different estimated years of useful life and the total of such figures for all of the items of such category of different estimated years of useful life up to a specific date, namely, December 31, 1908.

It is noted that by comparison of the total depreciations given in schedule 4 with the total acquisitions given in shedule 3 it is possible to compute what may be called composite rates of depreciation for the properties for each estimated year of useful life for the category to which the schedules of Figs. 3 and 4 relate, namely, "construction, buildings", and this has been shown in Fig. 7.

Fig. 5 shows a typical schedule of acquisitions by years and totals up to the end of each year for a large number of different categories;

Fig. 6 shows a typical schedule of depreciation for each year and depreciation up to the end of each year for a large number of different categories corresponding to Fig. 5.

It is noted that Figs. 5 and 6 also show their respective items as totaled up to December 1, 1908.

Fig. 7 shows a typical schedule for the specific category of "buildings", showing the estimated years of useful life and estimated actual rate of depreciation for different items of this category having different estimated years of useful life. This schedule makes it possible to establish a composite rate of depreciation for all of the properties classified as "buildings" in the particular plant in question, so that in the future a composite rate of depreciation may be applied to all of these properties which will be a fair and proper average; and Fig. 8 shows a typical schedule of composite rates of depreciation for different categories of properties each of which would be ascertained through the medium of a schedule similar to that of Fig. 7.

The schedule shown in Fig. 1 is intended to be illustrative of such a schedule as would be used for showing the acquisitions by years, and the depreciations by years, for all items of a given category such as "construction" and all of which items are subject to the same rate of depreciation. This schedule includes a column 10 for "years"; a column 11 for "acquisitions"; a column 12 for "total rate of depreciation" for items purchased at different times up to a given date, namely, December 31, 1908; a column 13 for "total amount of depreciation" for items purchased at different times up to December 31, 1908; and a series of columns 14, 15, 16, 17, 18, 19 and 20 for "amounts of depreciation" for years subsequent to the stipulated date of December 31, 1908.

In the column 11 are shown the individual items of acquisitions during years in question as well as the summation of all items including those brought forward from previous years. For example, this column shows that during the year 1899 the acquisitions amounted to $504.15, so that the total at the end of such year was $7,695.73. The depreciation rates shown in column 13 are the total depreciations from the dates of acquisition up to the stipulated date of December 31, 1908, and the items shown in this column are therefore equal to the number of years up to December 31, 1908, multiplied by the annual rate of depreciation. The "annual rate of depreciation" is shown in the heading at the point 21; and the "rate of depreciation for the current year of acquisition" is shown in the heading at 22. This item 22 is taken as one-half of the item 21, since this gives a fair average for items purchased during the year.

In column 13 the total rates of column 12 have been applied to the acquisition items of column 11. The summation of all of the items of column 13 shows the total amount of depreciation up to the specific date selected, namely, December 31, 1908. This happens to be $3,049.92, in the example illustrated.

The individual items in the columns 14, 15, 16, 17, 18, 19 and 20 are the actual amounts of depreciation during the various years subsequent to December 31, 1908, based on the acquisitions of previous individual years. For example, the depreciation during 1910 on acquisitions of 1899 is $7.76. The summation of items in the columns 14, 15, 16, 17, 18, 19 and 20 are the total depreciations during each of said years. For example, the total depreciations during 1910 are $431.49. The total amount of depreciation up to the end of any year subsequent to December 31, 1908, is the summation of depreciation of individual years plus depreciations up to December 31, 1908. For example, the total depreciation up to the end of 1910 is shown at the bottom of column 15, the same including $3,049.92 up to the end of December 31, 1908, plus $431.46 for 1909 plus $431.49 for 1910, a total of $3912.87. The arrows 23, 24, 25, 26 and 27 show the manner in which the items are carried forward year to year in order to arrive at the estimated total at the end of 1910.

It is observed that the schedule illustrated in Fig. 1 is based on an estimated life of sixty-five years and the depreciation rates shown at 21 and 22 are based on this particular length of life. In Fig. 2 I have shown another typical schedule similar to that of Fig. 1, but illustrating the acquisitions and depreciation rates and amounts for another typical class of "machinery," and based on the estimated life of thirty-seven years. The depreciation rates shown at 28 and 29 in this schedule are based on such estimated life, and the amounts of depreciation shown in the various columns are calculated on the basis of the particular depreciation rates shown at 28 and 29.

It is intended that a schedule similar to those of Figs. 1 and 2 should be worked out for each particular class of property and for properties of each particular estimated years of useful life, so that the proper rates of depreciation may be applied in each case.

In Fig. 3 I have shown a typical schedule on which the acquisitions on properties having various estimated lengths of useful life, but all within a given general category may be brought together. The particular schedule of Fig. 3 relates to the category of "construction buildings." It includes a column 30 for the number of years of estimated useful life of each group, a column 31 for the schedule numbers, a column 32 for the total acquisitions up to a given date such as December 31, 1908, and groups of columns 33, 34, 35, 36, 37, 38 and 39 for the years subsequent to 1908. Each of the groups 33 to 39 inclusive includes a column for acquisitions during that year and another column for total including such acquisitions.

Referring back to the schedule of Fig. 1 which relates to "construction," estimated life sixty-five years, it will be noted that during the year 1912 there were shown acquisitions of $1712.12, so that at the end of that year the total items of an estimated life of sixty-five years is $29,749.32. These two items are shown in the column 36 of the schedule of Fig. 3. From the foregoing illustration it will be understood that the items in the sixty-five year life row of Fig. 3 are derived from the schedule of Fig. 1. The items for other estimated useful lengths of life of properties in the category "construction buildings" would be taken from other schedules similar to Fig. 1 and transferred into the various columns of the schedule of Fig. 3.

The schedule of Fig. 3 is useful as bringing together the total properties of a given category and as showing the amounts of such properties acquired during years and the totals at the ends of various years.

In the schedule illustrated in Fig. 4 the depreciations for properties of various estimated lengths of useful life for a given category have been brought together. This schedule shows the depreciations for category "construction buildings," and is intended to show the depreciations for the items within that category having different estimated lengths of useful life. This schedule therefore includes a column 40 for the different "estimated years of useful life," a column 41 within which the various items may be classified, a column 42 for "total depreciations up to December 31, 1908," and groups of columns 43, 44, 45, 46, 47, 48 and 49 for the different years subsequent to 1908. Each of these groups include a column for "depreciation during the year" and another column for "total depreciation up to the end of such year."

Considering again the schedule of Fig. 1, the total depreciation up to December 31, 1908 for all items of "construction" of an estimated life of sixty-five years is shown to be $3,049.92, and this item has been transferred to column 42 of the schedule of Fig. 4 within the row for sixty-five year life. In similar manner the depreciation during the year 1909 is shown by the schedule of Fig. 1 to be $431.46 and the total depreciation up to the end of 1909 is shown to be $3,481.38. These items will be found in column 43 of the schedule of Fig. 4 in the row sixty-five year life.

The schedule of Fig. 4 is therefore useful for showing the depreciation during each year and the total depreciation up to the end of each year for the various properties of different estimated lengths of useful life for the category "construction buildings." It is intended that there should be a schedule similar to that of Fig. 3 and another schedule similar to that of Fig. 4 for each category of properties.

In the schedule shown in Fig. 5 the totals of acquisitions during different years and up to the end of each year for different categories have been brought together into convenient form. This schedule includes a column 50 for "items of different classification," a column 51 for "schedule numbers," a column 52 for "page numbers," a column 53 for "total acquisitions up to December 31, 1908," and groups of columns 54, 55, 56, 57, 58, 59 and 60 for different years subsequent to 1908. Each of these groups includes a column for "acquisitions during such year" and another column for "total to the end of the year." Examination of the schedule illustrated in Fig. 3 shows that the total amount of acquisitions up to December 31, 1908, for properties of the classification "construction buildings" of various lengths of estimated life is $59,811.33, and this item will be found in column 53 of schedule 5 in the row "buildings." In like manner the various acquisitions and totals for different years for the category "buildings" given in Fig. 5 have been transferred from the schedule of Fig. 3. The other items shown in the schedule of Fig. 5 would be taken from other schedules similar to that of Fig. 3 for the various other categories of properties. The schedule shown in Fig. 5 is useful for bringing together all of the various items of acquisitions and totals of properties for the entire plant.

The schedule of Fig. 6 is similar to that of Fig. 4, but brings together the depreciations during different years and up to the end of each year for the various categories and corresponds somewhat to the schedule of Fig. 5. This schedule of Fig. 6 includes a column 61 for "classification," a column 62 for "schedules," a column 63 for "page numbers," a column 64 for "total depreciations up to December 31, 1908," and groups of columns 65, 66, 67, 68, 69, 70 and 71 for subsequent years. Each of these groups includes a column for "depreciation during the year" and another column for "total to the end of the year." The items in the schedule of Fig. 6 are transferred thereto from a series of schedules similar to Fig. 4 and for the different categories of properties. For example, the schedule of Fig. 4 shows a total depreciation on "construction buildings" to December 31, 1908 to be $4608.96, and this item will be found in column 64 of the schedule of Fig. 6 opposite to the category "buildings." The schedule of Fig. 6 is useful as bringing together the depreciations during different years and total depreciations at the end of each year for all of the properties within the plant.

Manifestly, a comparison of the schedules of Figs. 5 and 6 will give the estimated value of the plant or any category at the end of any specified year, by the simple process of subtraction. For example, the total acquisitions to the end of 1915 were $366,701.88, and the total depreciations up to the end of that year $54393.58, leaving a net value of plant at the end of 1915 of $312308.30. Similarly the value of the plant at the end of 1913 would be estimated as $307,875.99 minus $39,068.45 or $268,807.54.

After an inventory has been completed, so that the values of properties of different estimated years of life has been determined, it is possible to establish for any given category, or for the plant as a whole, a composite rate of depreciation applicable to all of the properties within such category or plant. In Fig. 7 I have shown a typical schedule relating to the category "buildings, construction," for this purpose. In this schedule is included a column 72 for the "classification," a column 73 for "total acquisitions up to the date of the inventory," a column 74 for the "estimated years of useful life," a column 75 for the "annual rate of depreciation," and a column 76 for the "amounts of annual depreciation." Since the schedule of Fig. 7 relates to a single category containing properties of different estimated years of useful life the total acquisitions for properties of each of these estimated years of life are noted in column 73, the estimated years of life in column 74, and the annual rate of depreciation based on such years of life in column 75. The annual depreciation appearing in column 76 is the application of the annual rate of depreciation to the total acquisitions of column 73. It is noted that the items in column 73 correspond to those in column 39 of the schedule of Fig. 3, and that the items of column 76 correspond to the depreciation items of column 49 of the schedule shown in Fig. 4. By taking the summation of the items of column 76 which gives the total annual depreciation and comparing the same with the summation of the items of column 73 which gives the total amount of acquisition, there is obtained an "average rate of depreciation" indicated at 77 in Fig. 7. The "average rate of depreciation current for the year of acquisition" is one-half of the amount shown at 77, being the amount shown at 78 in schedule 7. These composite rates of depreciation will be correct as long as there are no further acquisitions within the category in question, or as long as the ratios existing between the amounts of acquisitions of properties of different years of estimated useful life is the same as the ratio existing between such properties at the date of the inventory.

In Fig. 8 I have shown a schedule of "composite rates of depreciation" for all of the different categories, each category being figured out according to the plan of the schedule of Fig. 7. The schedule of Fig. 8 includes a column 79 for "classification," a column 80 for "rate for current year of acquisition," and a column 81 for "rate for the full year." It is to be noted that the items in columns 80 and 81 correspond to the category "buildings" are the same as the amounts shown at 78 and 77 respectively of Fig. 7.

It is to be observed that all of the schedules of the general arrangements and purposes herein disclosed bear a peculiar relation to each other in the sense that they constitute portions of a complete harmonious ensemble, all of whose parts are so related to each other as to carry forward the desired operations to a certain distinct and definite end. For this purpose, the schedule of Fig. 1 is illustrative of one of a group of schedules whose purpose is to bring together in systematic and properly arranged order data by means of which the schedules illustrated in Figs. 3 and 4 may be filled out, and the schedule illustrated in Fig. 2 is illustrative of another such schedule; the schedule illustrated in Fig. 3 is illustrative of a schedule whose purpose is to bring together in systematic and well arranged order the data by means of which a schedule such as that of Fig. 5 may be prepared, and the schedule of Fig. 4 performs the same function with regard to that of Fig. 6, and the schedules of Figs. 5 and 6 may be termed the summation or terminal schedules, the one for acquisitions, and the other for depreciations, by means of which the acquisitions and depreciations up to any given date may be individually determined, by means of which the depreciated value of the entire plant or any category of properties therein may be quickly ascertained in a simple manner at any time. The schedules of Figs. 7 and 8 may be considered as supplemental for the purpose of facilitating the future estimation of depreciation as long as the relative acquisitions between properties of different estimated years of useful life remain in substantially the same ratio.

It is thus evident that schedules of the general character of those herein disclosed bear a peculiar relationship and combination to each other.

In the usual course of operation of any business there will be from time to time what are known as discards, machinery or other property which is either junked or sold or otherwise disposed of. These discards may be taken care of in the operation of the present register as a reduction in the amount of acquisitions during the year within which the discard takes place. If the amount of the discards of such year are less than the amount of actual acquisitions then the amount of acquisitions appearing on the register will be positive but of reduced quantity, whereas if the discards during such year are greater in amount than the actual acquisitions, the acquisitions appearing on the register will be negative in amount. The depreciation for the discard will be carried up to the year within which the discards take place and will be fixed in quantity for such discards thereafter.

I wish also to point out the fact that the depreciation schedules may be used for a wide number of different purposes besides the preparation of tax schedules, etc. For example, they may be used to advantage in the preparation of accounting and financial statements, and in fact these uses constitute a very great and important portion of the usefulness of the invention.

While I have herein shown and described only a single embodiment of the features of my present invention, still I do not limit myself to the said embodiment except as I may do so in the claims.

I claim:

1. A valuation register for properties of different categories having different rates of depreciation for items of each category, and having items of acquisition at different times, comprising in combination a schedule "A" by years of acquisition and depreciation for each rate of depreciation, a schedule "B"

for summary of acquisitions of items of different rates of depreciation within the same category; a schedule "C" for summary of depreciation for items of different rates of depreciation within the same category; a schedule "D" for summary of acquisition of items of all categories; and a schedule "E" for a summary of depreciation of items of all categories; each "A" schedule having an appropriately designated column for years, an appropriately designated column for acquisitions, an appropriately designated column for total rate of depreciation up to a given date, an appropriately designated column for total amount of depreciation up to said date, and a series of appropriately designated columns for depreciation during years succeeding such date, and having appropriately designated rows for years during which there are acquisitions as well as an appropriately designated row for depreciation accrued to the end of the period; each "B" schedule having an appropriately designated column for estimated years of useful life, an appropriately designated column for summary of acquisitions up to the aforesaid date, and a group of appropriately designated columns for years subsequent to such date, each group including acquisitions during the year and totals to the end of the year, and including a series of appropriately designated rows for years of useful life and an appropriately designated row for totals; each "C" schedule including an appropriately designated column for different years of useful life, an appropriately designated column for total depreciation up to a given date, and a series of groups of appropriately designated columns for years subsequent to such date, each group including an appropriately designated column for depreciations during the year and totals up to the end of such year, and a series of appropriately designated rows for different years of useful life and an appropriately designated row for totals; each "D" schedule including an appropriately designated column for classification, and groups of appropriately designated columns for years subsequent to such date, each group of columns including an appropriately designated column for acquisitions during the year and an appropriately designated column for total acquisitions to the end of the year, and a series of appropriately designated rows for items of different categories, and an appropriately designated row for totals; and each "E" schedule including an appropriately designated column for classification, an appropriately designated column for total depreciation up to the aforesaid date, and a series of groups of appropriately designated columns for years subsequent to such date, each group including an appropriately designated column for depreciation during such year and an appropriately designated column for totals up to the end of such year, and a series of appropriately designated rows for different categories and an appropriately designated row for totals, all for the purpose specified.

2. A valuation register for properties of different categories having different rates of depreciation for items of each category, and having items of acquisition at different times, comprising in combination a schedule "A" by years of acquisition and depreciation for each rate of depreciation, a schedule "B" for summary of acquisitions of items of different rates of depreciation within the same category; a schedule "C" for summary of depreciation for items of different rates of depreciation within the same category; a schedule "D" for summary of acquisitions of items of all categories; and a schedule "E" for a summary of depreciation of items of all categories; each "A" schedule having an appropriately designated column for years, an appropriately designated column for acquisitions, an appropriately designated column for total rate of depreciation up to a given date, an appropriately designated column for total amount of depreciation up to said date, and a series of appropriately designated columns for depreciation during years succeeding such date, and having appropriately designated rows for years during which there are acquisitions; each "B" schedule having an appropriately designated column for estimated years of useful life, an appropriately designated column for summary of acquisitions up to the aforesaid date, and a group of appropriately designated columns for years subsequent to such date, each group including acquisitions during the year and totals to the end of the year, and including a series of appropriately designated rows for years of useful life; each "C" schedule including an appropriately designated column for different years of useful life, an appropriately designated column for total depreciation up to a given date, and a series of groups of appropriately designated columns for years subsequent to such date, each group including an appropriately designated column for depreciations during the year and totals up to the end of such year, and a series of appropriately designated rows for different years of useful life; each "D" schedule including an appropriately designated column for classification, an appropriately designated column for total acquisitions up to the aforesaid date, and a series of groups of appropriately designated columns for years subsequent to such date, each group of columns including an appropriately designated column for acquisitions during the year, and an appropriately designated column for total acquisitions to the end of the year, and a series of appropriately designated rows for items of different categories; and each "E" schedule including an appropriately designated column for classification, an appropriately designated column for total depreciation up to the aforesaid date, and a series of groups of appropriately designated columns for years subsequent to such date, each group including an appropriately designated column for depreciation during such year and an appropriately designated column for totals up to the end of such year, and a series of appropriately designated rows for different categories, all for the purpose specified.

3. A valuation register for properties of different categories having different rates of depreciation, and having items of acquisition at different times, comprising in combination a schedule "A" by years of acquisition and depreciation for each rate of depreciation, a schedule "B" for summary of acquisitions of items of different rates of depreciation; a schedule "C" for summary of depreciation for items of different rates of depreciation; a schedule "D" for summary of acquisition of items of all categories; and a schedule "E" for a summary of depreciation of items of all categories; each "A" schedule having an appropriately designated column for years, an appropriately designated column for acquisitions, an appropriately designated column for total rate of depreciation up to a given date, an appropriately designated column for total amount of depreciation up to said date, and a series of appropriately designated columns for depreciation during years succeeding such date, and having appropriately designated rows for years during which there are acquisitions; each "B" schedule having an appropriately designated column for estimated years of useful life, an appropriately designated column for summary of acquisitions up to the aforesaid date, and a group of appropriately designated columns for years subsequent to such date, each group including acquisitions during the year and totals to the end of the year and including a series of appropriately designated rows for years of useful life; each "C" schedule including an appropriately designated column for different years of useful life, an appropriately designated column for total depreciation up to a given date, and a series of groups of appropriately designated columns for years subsequent to such date, each group including an appropriately designated column for depreciation during the year and totals up to the end of such year, and a series of appropriately designated rows for different years of useful life; each "D" schedule including an appropriately designated column for classification, an appropriately designated column for total acquisitions up to the aforesaid date, and a series of groups of appropriately designated columns for years subsequent to such date, each group of columns including an appropriately designated column for acquisitions during the year and an appropriately designated column for total acquisitions to the end of the year, and a series of appropriately designated rows for items of different categories; and each "E" schedule including an appropriately designated column for classification, an appropriately designated column for total depreciation up to the aforesaid date, and a series of groups of appropriately designated columns for years subsequent to such date, each group including an appropriately designated column for depreciation during such year and an appropriately designated column for totals up to the end of such year, and a series of appropriately designated rows for different categories, all for the purpose specified.

4. A valuation register for properties of different categories having different rates of depreciation for items of each category, and having items of acquisitions at different times, comprising in combination a series of schedules "A", each showing by years acquisitions and depreciations for a given rate of depreciation, a series of schedules "B", each showing by years a summary of acquisitions of items for a given rate of depreciation; a series of schedules "C", each showing a summary of depreciations for items of different rates of depreciation within a given category; a schedule "D" for summary of acquisitions of items of all categories; and a schedule "E" for a summary of depreciations of all items of all categories; each "A" schedule having an appropriately designated column for years, an appropriately designated column for acquisitions, an appropriately designated column for total rate of depreciation up to a given date, an appropriately designated column for total amount of depreciation up to said date, and a series of appropriately designated columns for depreciation during years succeeding such date, and having appropriately designated rows for years during which there are acquisitions; each "B" schedule having an appropriately designated column for estimated years of useful life, an appropriately designated column for summary of acquisitions up to the aforesaid date, and a group of appropriately designated columns for years subsequent to such date, each group including acquisitions during the year and totals to the end of the year, and including a series of appropriately designated rows for years of useful life; each "C" schedule including an appropriately designated column for different years of useful life, an appropriately designated column for total depreciation up to a given date, and a series of groups of appropriately designated columns for years subsequent to such date, each group including an appropriately designated column for depreciation during the year and totals up to the end of such year, and a series of appropriately designated rows for different years of useful life; each "D" schedule including an appropriately designated column for classification, an appropriately designated column for total acquisitions up to the aforesaid date, and a series of groups of appropriately designated columns for years subsequent to such date, each group of columns including an appropriately designated column for acquisitions during the year and an appropriately designated column for total acquisitions to the end of the year, and a series of appropriately designated rows for items of different categories; and each "E" schedule including an appropriately designated column for classification, an appropriately designated column for total depreciation up to the aforesaid date, and a series of groups of appropriately designated columns for years subsequent to such date, each group including an appropriately designated column for depreciation during such year and an appropriately designated column for totals up to the end of such year, and a series of appropriately designated rows for different categories, all for the purpose specified.

5. A valuation register for properties of different categories having different rates of depreciation for items of each category, and having items of acquisitions at different times, comprising in combination a series of schedules "A", each showing by years acquisitions and depreciations for a given rate of depreciation, a series of schedules "B", each showing by years a summary of acquisitions of items for a given rate of depreciation; a series of schedules "C", each showing a summary of depreciations for items of different rates of depreciation within a given category; a schedule "D" for summary of acquisitions of items of all categories; and a schedule "E" for a summary of depreciations of all items of all categories; each "A" schedule having appropriately designated columns and rows for the determination of acquisitions and depreciations of items of a given category and given rate of depreciation up to a selected date and subsequent dates; each "B" schedule having appropriately designated columns and rows for the reception of total items of acquisition up to such date and subsequent dates, transcribed from the "A" schedules for different rates of depreciation; each "C" schedule having appropriately designated columns and rows for the reception of items of total depreciation up to the selected date and subsequent dates, transcribed from the "A" schedules for different rates of depreciation; the "D" schedule having appropriately designated columns and rows for the reception of items of total acquisitions for the plant up to the selected date and up to subsequent dates, transcribed from the "B" schedules; and the "E" schedule having appropriately designated columns and rows for the reception of items of total depreciation for the plant up to the selected date and subsequent dates transcribed from the "C" schedules, all for the purpose specified.

6. A valuation register for properties of different categories having different rates of depreciation for items of each category, and having items of acquisitions at different times, comprising in combination a series of schedules "A", each showing by years acquisitions and depreciations for a given rate of depreciation, a series of schedules "B", each showing by years a summary of acquisitions of items for a given rate of depreciation; a series of schedules "C", each showing a summary of depreciations for items of different rates of depreciation within a given category; a schedule "D" for summary of acquisitions of items of all categories; and a schedule "E" for a summary of depreciation of all items of all categories; each "A" schedule having appropriately designated columns and rows for the determination of acquisitions and depreciations of items of a given category and given rate of depreciation up to a selected date; each "B" schedule having appropriately designated columns and rows for the reception of total items of acquisitions up to such date, transcribed from the "A" schedules for different rates of depreciation; each "C" schedule having appropriately designated columns and rows for the reception of items of total depreciation up to the selected date, transcribed from the "A" schedules for different rates of depreciation; the "D" schedule having appropriately designated columns and rows for the reception of items of total acquisitions for the plant up to the selected date transcribed from the "B" schedules; and the "E" schedule having appropriately designated columns and rows for the reception of items of total depreciation for the plant up to the selected date transcribed from the "C" schedules, all for the purpose specified.

HENRY ARCHIBALD HARRIS.